US008140254B2

(12) United States Patent
Mutoh et al.

(10) Patent No.: US 8,140,254 B2
(45) Date of Patent: Mar. 20, 2012

(54) ROAD MAP DATA GENERATION APPARATUS, ROAD MAP DATA GENERATION SYSTEM, AND METHOD FOR GENERATING ROAD MAP DATA

(75) Inventors: Shigehiro Mutoh, Anjo (JP); Toshio Nomura, Obu (JP)

(73) Assignee: Denso Corporation, Kariya (JP)

( * ) Notice: Subject to any disclaimer, the term of this patent is extended or adjusted under 35 U.S.C. 154(b) by 358 days.

(21) Appl. No.: 12/213,798

(22) Filed: Jun. 24, 2008

(65) Prior Publication Data
US 2008/0319641 A1 Dec. 25, 2008

(30) Foreign Application Priority Data
Jun. 25, 2007 (JP) .................. 2007-166296

(51) Int. Cl.
G01C 21/00 (2006.01)
G08G 1/123 (2006.01)
(52) U.S. Cl. .................. 701/201; 340/995.19
(58) Field of Classification Search .......... 701/200–226; 340/988–996
See application file for complete search history.

(56) References Cited

U.S. PATENT DOCUMENTS

| 5,589,948 | A  | * | 12/1996 | Itezono ............ 358/449 |
| 6,556,920 | B2 | * | 4/2003  | Kaneko et al. ......... 701/208 |
| 7,643,505 | B1 | * | 1/2010  | Colloff ............ 370/422 |
| 2004/0002812 | A1 | * | 1/2004 | Yamanaka ............ 701/208 |
| 2005/0257109 | A1 | * | 11/2005 | Averbuj et al. ........ 714/733 |
| 2005/0288836 | A1 |   | 12/2005 | Glass et al. |
| 2006/0265118 | A1 | * | 11/2006 | Lee et al. ............ 701/117 |

FOREIGN PATENT DOCUMENTS

| EP | 0 807 803 | 11/1997 |
| JP | A-08-087234 | 4/1996 |
| JP | A-9-297529 | 11/1997 |
| JP | A-2002-048578 | 2/2002 |
| JP | A-2002-365077 | 12/2002 |
| JP | A-2005-525763 (T) | 8/2005 |
| JP | A-2006-71927 | 3/2006 |
| JP | A-2006-154046 | 6/2006 |

OTHER PUBLICATIONS

Office Action dated May 26, 2009 from Japan Patent Office in the corresponding JP Application No. 2007-166296 (and English Translation).

Extended European Search Report dated Jul. 1, 2011 in the corresponding European patent application No. 08010921.8 (copy enclosed).

* cited by examiner

Primary Examiner — James Trammell
Assistant Examiner — Muhammad Shafi
(74) Attorney, Agent, or Firm — Posz Law Group, PLC

(57) ABSTRACT

In a road map data generation apparatus, existing primary road map data is subjected to a deletion process according to a deletion rule to delete a portion of the data. Thus, reduced road map data is generated for a storage medium such as a memory card having a data volume smaller than the primary road map data. A navigation apparatus using the reduced road map data stored in the memory card records a restoration rule pairing with the deletion rule. Based on the restoration rule, the reduced road map data can be restored to the primary road map data. Thus, the deletion rule can decrease the data volume of the primary data to thereby generate the reduced data, whereas the restoration rule can restore the reduced data to the primary data in the navigation apparatus. This helps prevent worsening of the quality of the road map data and lowering of the user's satisfaction.

4 Claims, 6 Drawing Sheets

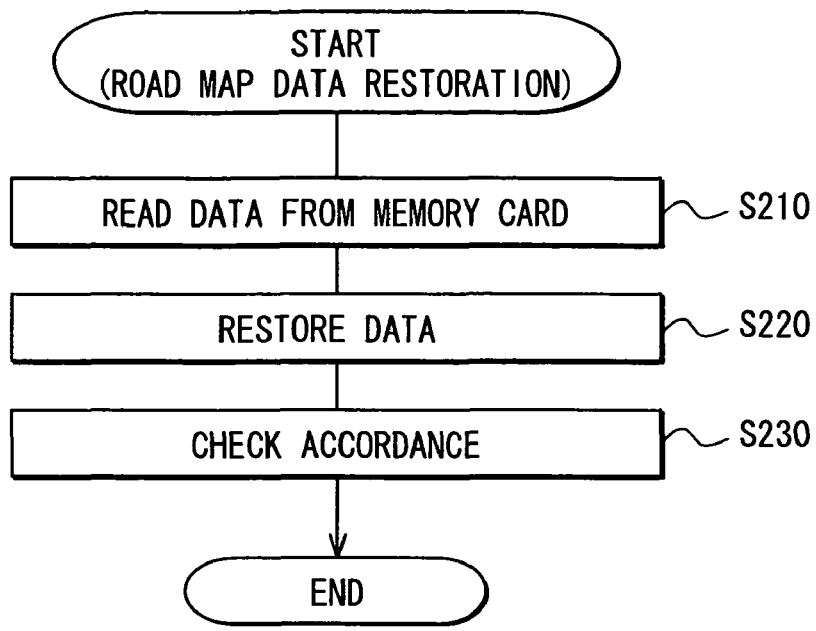
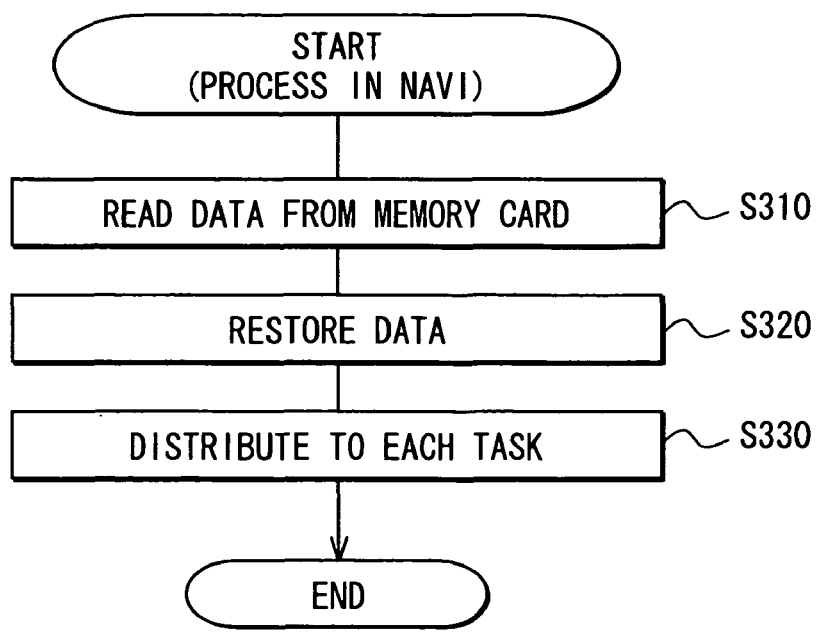

ROAD MAP DATA GENERATION APPARATUS, ROAD MAP DATA GENERATION SYSTEM, AND METHOD FOR GENERATING ROAD MAP DATA

CROSS REFERENCE TO RELATED APPLICATION

This application is based on and incorporates herein by reference Japanese Patent Application No. 2007-166296 filed on Jun. 25, 2007.

FIELD OF THE INVENTION

The present invention relates to a road map data generation apparatus or system, or a method for generating road map data with a smaller data volume from predetermined road map data.

BACKGROUND OF THE INVENTION

A conventional navigation apparatus to navigate has a storage medium such as a hard disk drive (HDD), or DVD-ROM to store road map data. The HDD has a data storage capacity of several tens to several hundreds GB (Giga Byte); the DVD-ROM, several to several tens GB.

The HDD or DVD-ROM has such a large storage capacity enough to store road map data having a larger data volume, thereby being mainstream in use for storing road map data.

In contrast, a navigation apparatuses using a CD-ROM/RAM as a storage medium for storing road map data is still present. In addition, a navigation apparatus using a card-type or chip-type flash memory (called a memory card) for storing road map data has been developed. This is because a memory card is easy to rewrite data while the data capacity has been recently increased.

Note that the storage capacity of a memory card is still smaller (several GB) than that of the HDD or DVD-ROM (several hundreds GB) although having been increased rapidly.

Thus, in many cases, the road map data generated for a HDD or DVD-ROM cannot be directly stored or transferred in a memory card or CD-ROM/RAM without modification. If the road map data prepared for a HDD or DVD-ROM (called large road map data) is used for a memory card or CD-ROM/RAM, the following methods can be used, for example.

(1) Deleting data which is deletable in the large road map data; or (2) Transforming a data format of the large road map data to a different one which can reduce the data volume.

For example, in the method (1), partial road map data corresponding to unnecessary areas is deleted while data corresponding to the necessary area remains; further, data for audio guidance is deleted.

While any Patent document explicitly disclosing the above methods (1) (2) is not retrieved, Patent document 1 describes an idea to delete unnecessary data among the road map data stored in a HDD.

Patent document 1: JP-2001-165669 A (corresponding to U.S. Pat. No. 6,556,920)

Adopting the method (1) may lower the quality of the road map data. The satisfaction of a user therefore seems to be limited or lowered.

In addition, adopting the method (2) may require to start from the definition or development of the new format which can reduce data volume in some cases. In the event of using the existing format, the transformation of the format might be rather difficult, requiring additional many man days. For example, the road map data after the transformation should require inspection to check for abnormalities or errors.

SUMMARY OF THE INVENTION

The present invention is made in view of the problem above. It is an object of the present invention to provide an apparatus, system and method for generating road map data having a data volume smaller than predetermined road map data while maintaining a user's satisfaction.

According to an example of the present invention, a road map data generation apparatus for generating road map data for a navigation apparatus is provided. Here, the navigation apparatus uses a storage device for storing road map data, which is offered for navigating, the offered road map data being generated by applying a predetermined deletion rule to large road map data which has a data volume larger than a storage capacity of the storage device. The navigation apparatus applies a predetermined restoration rule pairing with the deletion rule to the offered road map data read from the storage device to thereby restore the offered road map data to a state before the deletion rule is applied. The road map data generation apparatus comprises an acquiring means for acquiring the large road map data; and a deleting means for applying the deletion rule to the acquired large road map data to thereby perform a deletion process which deletes a portion of the acquired large road map data so as to generate road map data reduced to a data volume equal to or less than the storage capacity of the storage device used in the navigation apparatus. Herein, the reduced road map data is generated as the road map data offered for the navigating.

According to an example of the present invention, a method is provided for generating road map data for a navigation apparatus. The navigation apparatus is similar to that described in the above road map data generation apparatus. Herein, the method comprises: (i) acquiring the large road map data; and (ii) applying the deletion rule to the acquired large road map data to thereby perform a deletion process which deletes a portion of the acquired large road map data so as to generate road map data reduced to a data volume equal to or less than the storage capacity of the storage device used in the navigation apparatus. Herein, the reduced road map data is generated as the road map data offered for the navigating.

As an example of the present invention, a road map data generation system is provided as follows. A first storage medium is included for storing primary road map data. A second storage medium is included with a storage capacity having a data volume smaller than the primary road map data. A road map data generation apparatus is included to have (i) a primary data acquiring means for acquiring the primary road map data from the first storage medium, and (ii) a deleting means for applying a deletion rule to the acquired primary road map data to thereby perform a deletion process which deletes a portion of the acquired primary road map data so as to generate road map data reduced to a data volume equal to or less than the storage capacity of the second storage medium, the reduced road map data being stored in the second storage medium. A navigation apparatus is included to have (i) a reduced data acquiring means for acquiring the reduced road map data from the second storage medium, and (ii) a restoring means for applying a restoration rule pairing with the deletion rule to the acquired reduced road map data to thereby perform a restoration process which restores the deleted portion of the primary road map data so as to generate road map data offered for navigating.

As an example of the present invention, a method is provided for using road map data stored in a storage medium for navigating. The method comprises: (i) acquiring primary road map data having a data volume larger than a storage capacity of the storage medium; (ii) applying a deletion rule to the acquired primary road map data to thereby perform a deletion process which deletes a portion of the acquired primary road map data so as to generate road map data reduced to a data volume equal to or less than the storage capacity of the storage medium, the reduced road map data being stored in the storage medium; (iii) acquiring the reduced road map data from the second storage medium; and (iv) applying a restoration rule pairing with the deletion rule to the acquired reduced road map data to thereby perform a restoration process which restores the deleted portion of the primary road map data so as to generate road map data offered for navigating.

BRIEF DESCRIPTION OF THE DRAWINGS

The above and other objects, features, and advantages of the present invention will become more apparent from the following detailed description made with reference to the accompanying drawings. In the drawings:

FIG. 5 is a flowchart showing a road map data restoration process;

FIG. 7 is a flowchart showing a process executed in the navigation apparatus;

DETAILED DESCRIPTION OF THE PREFERRED EMBODIMENTS

Figure 1:
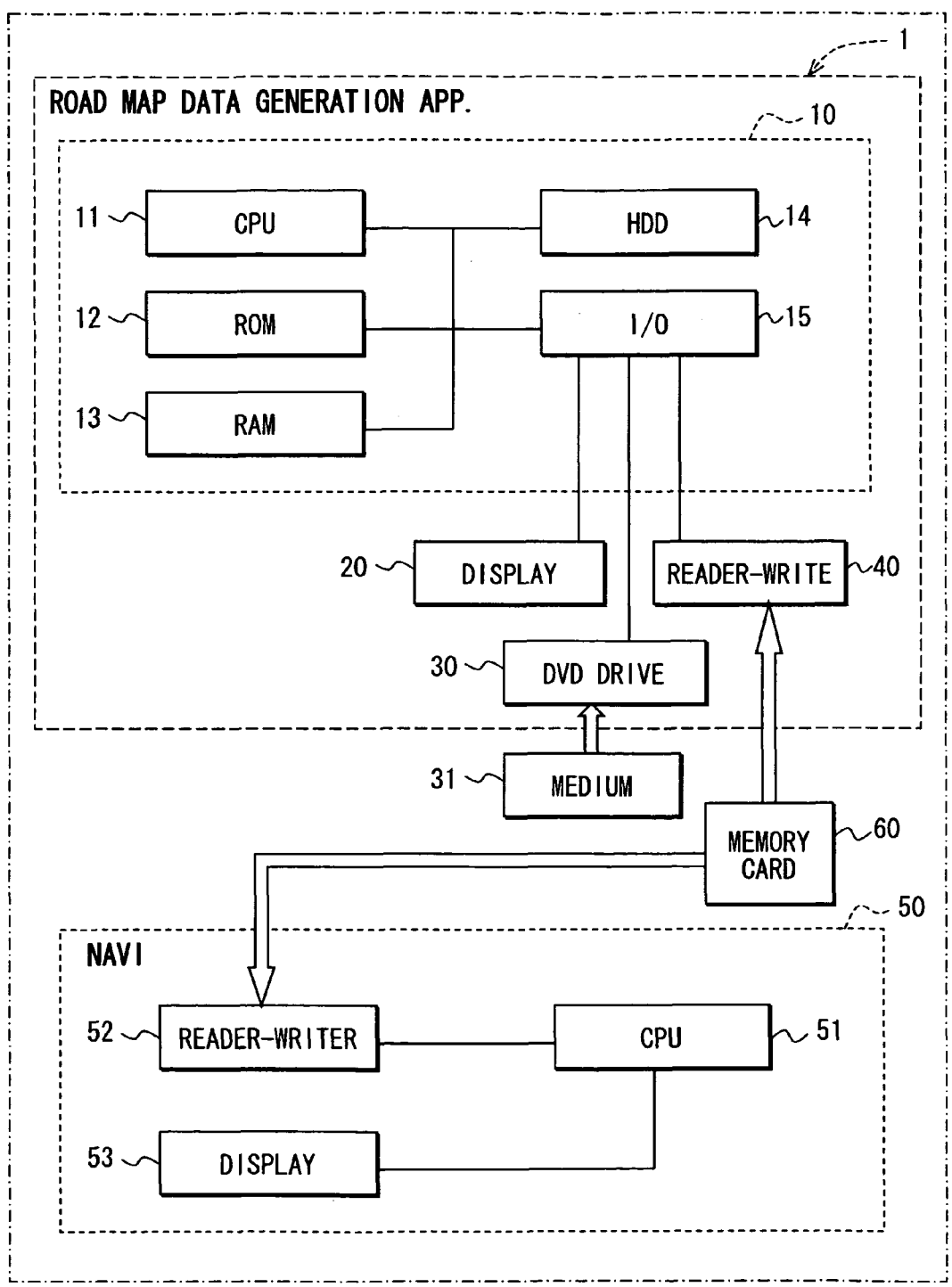
FIG. 1 is a schematic diagram showing a road map data generation apparatus and a navigation apparatus according to an embodiment of the present invention.

Hereafter, description will be given to an embodiment of the present invention with reference to the drawings. FIG. 1 is a schematic diagram showing a road map data generation apparatus 1 and a cooperative navigation apparatus 50 according to the embodiment. The road map data generation apparatus 1 generates road map data used in a navigation apparatus 50 which navigates or provides a route guidance to a driver of a subject vehicle mounted with the navigation apparatus 50. The road map data generation apparatus 1 generates road map data (referred to as offer road map data) from existing road map data (or called primary road map data), for example, which is recorded in a storage medium (31) such as a DVD-ROM or the like available as a product in the market. The offer road map data is generated as being suitable for a storage medium for storing road map data such as a removable memory card 60 used in the navigation apparatus 50. Herein, the storage capacity of the memory card 60 is smaller than the data volume of the existing road map data. The road map data generation apparatus 1 is used in conjunction with the navigation apparatus 50 along with the memory card 60; thus, the road map data generation apparatus 1, the navigation apparatus 50, and the memory card 60 may be configured as a road map data generation system.

The road map data generation apparatus 1 includes a personal computer (PC) 10 and peripherals connected with the PC 10 such as a display device 20, a DVD drive 30, and a memory card reader-writer 40.

The PC 10 includes a CPU 11 as a control device, a ROM 12, a RAM 13, a hard disk drive (HDD) 14, and an interface (I/O) 15. The CPU 11 executes various processes based on predetermined programs. The ROM 12 stores programs for execution of the CPU 11. The RAM 13 temporarily stores execution result etc. of the various processes of the CPU 11. The HDD 14 stores programs for execution of the CPU 11 and other various data. The interface 15 connects the PC 10 with the peripherals or external devices such as the display device 20, the DVD drive 30, and the memory card reader-writer 40.

The display device 20 displays various information obtained from the HDD 14, a DVD-ROM/RAM (not shown) etc. via the DVD drive 30, or the memory card 60 via the memory card reader-writer 40.

The DVD drive 30 reads information from a DVD-ROM/RAM etc., or writes information in a DVD-RAM etc. The memory card reader-writer 40 reads or writes information with the memory card 60.

Figure 2:
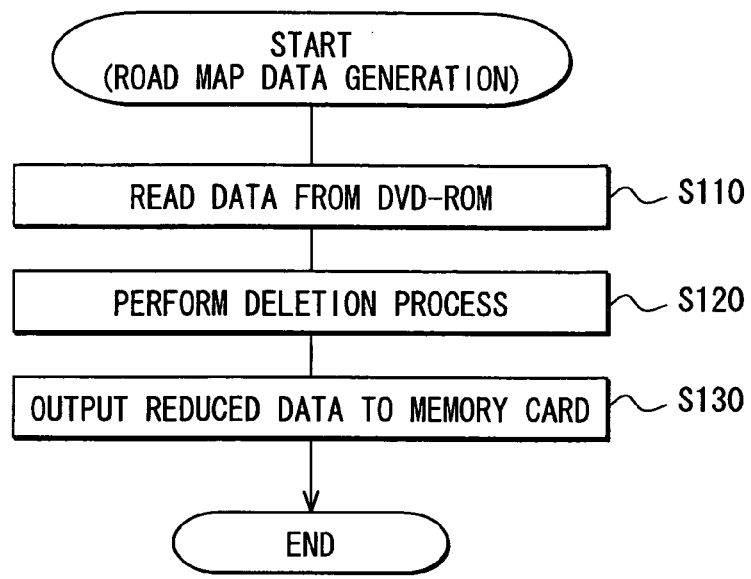
FIG. 2 is a flowchart showing a road map data generation process.

Next, FIG. 2 is a flowchart showing a road map data generation process executed by the CPU 11. This process is started based on a user's input, for example.

At S110, the primary road map data is read or obtained from a DVD-ROM/RAM or the like via the DVD drive 30. Herein, the primary road map data stored in the DVD-ROM/RAM or the like is assumed to be complete as a product available in the market.

Next, the processing proceeds to S120, where a data volume reduction process or deletion process takes place which reduces the data volume of the primary road map data read at S110. Here, the data volume reduction process is executed so that the data volume of the road map data after undergoing the data volume reduction process (referred to as reduced road map data) becomes smaller than the storage capacity of the memory card 60 as the storage medium of the navigation apparatus 50.

For instance, a portion of the primary road map data is deleted based on a predetermined deletion rule to be explained later. The deletion rule is predetermined and previously stored in the ROM 12 of the road map data generation apparatus 1, for example. The contents of the deletion rule may be suitably changed so that the data volume of the data reduction road map data becomes a desired value or data volume. Otherwise, in the data volume reduction process, a part of the deletion rule may be applied such that the data volume meets the desired value.

At S130, the reduced road map data generated at S120 is transmitted to the memory card reader-writer 40. The reduced road map data is thereby stored in the memory card 60 inserted into the memory card reader-writer 40. The process is then ended. Further, in addition, the memory card 60 storing the reduced road map data is used in the navigation apparatus 50.

The road map data includes: a road data frame having information indicating a road; a background data frame having information on background excluding roads and characters; a route data frame having information indicating a route to a destination; retrieval data (POI) for destination retrieval; and a name data frame having information such as building names, predetermined site names, and road and intersection names; and the like.

For instance, the following indicates each deletion rule item with respect to each of the road data frame, the background data frame, the route data frame, the retrieval data (POI), and the name data frame.

Figure 3A:
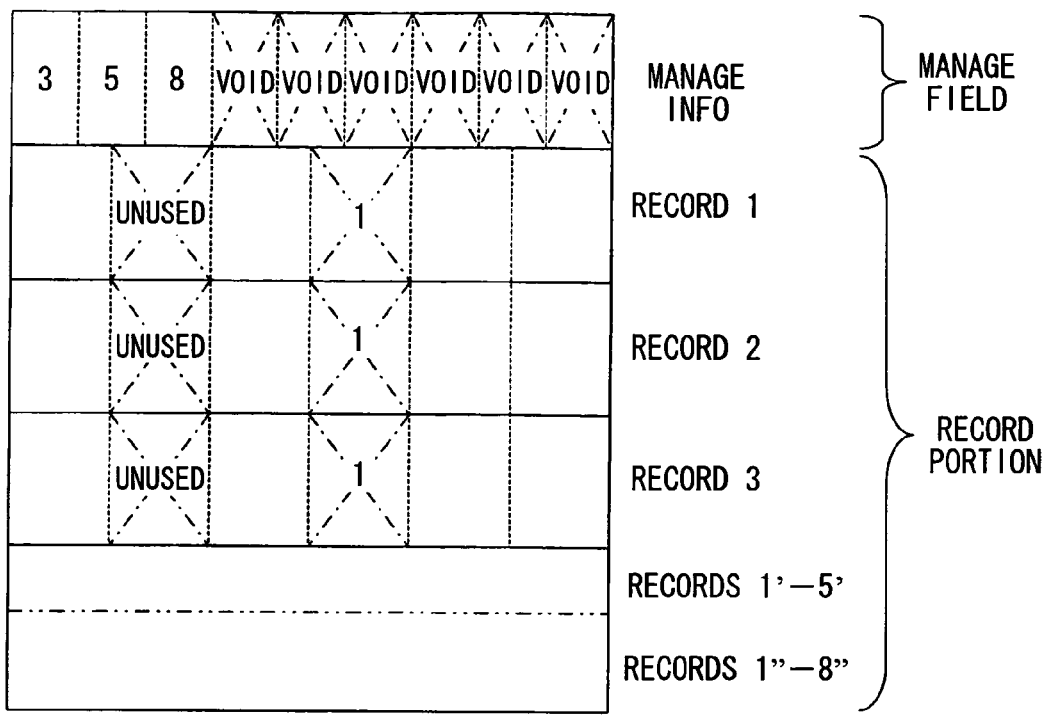
FIGS. 3A to 3C are diagrams illustrating examples of a structure of a road data frame.

(1) Road data frame
(i) unused deleted
(ii) fixed value: 1 deleted
(iii) management field: 9 to 3 reduced
(iv) identical node coordinates data deleted
(v) identical node end pointer deleted
(vi) large region data deleted
(vii) of (offset data+size data), size data deleted
(2) Background data frame
(viii) coordinates value varied to 1 to 4 bytes long
(3) Route data frame
(ix) long distance calculation data deleted
(4) Retrieval data (POI)
(x) "miscellaneous companies" category deleted
(5) Name data frame
(xi) all character data collected as offset information An example of the deletion rule about the road data frame is explained. FIG. 3A illustrates an example of a structure of a road data frame. The road data frame has a management field stores management information, and a record portion which has one or more records. Each record of the record portion stores information to display a road image in a display device. For example, when all the information in RECORD 1 are read out, a display image of an intersection can be drawn.

Management information of the management field defines the number of records.

For example, "3" at the leftmost defines the number of the records as three (3). The three records are defined directly under the management field (RECORDS 1 to 3). Further, in the management field, "5" at right of "3" defines five records (RECORDS 1' to 5') directly under the region of RECORDS 1 to 3. Similarly, in the management field, "8" at right of "5" defines eight records (RECORDS 1" to 8") directly under the region of the RECORDS 1' to 5'.

Further, each record may include unused area (void area) where data is not stored as shown in FIG. 3A. The deletion rule (1) (i) signifies that such unused area is deleted. Deleting an unused area means to delete the area itself, i.e., the data box which stores data is deleted.

In addition, each record has an area where a predetermined fixed value is stored. Storing a fixed value is based on a rule that, for example, a fixed value needs to be stored from a structural reason; namely, it is inevitable. The deletion rule (1) (ii) signifies that such an area or data box storing a fixed value is deleted. For instance, in FIG. 3A, three areas or data boxes each storing "1" as a fixed value are deleted.

In addition, the management field has a void area where management information is not stored. The deletion rule (1) (iii) signifies the void area or data box in the management field is deleted. In FIG. 3A, the management field has six void areas or data boxes on the right side among the nine data boxes. Thus, the six void areas are deleted.

Figure 3B:
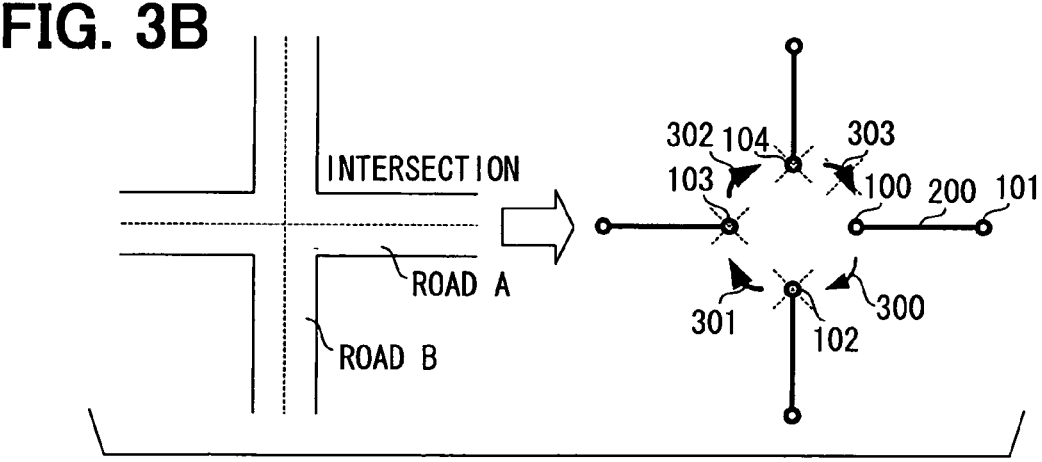

Further, relating to the road data frame, the image in the left portion of FIG. 3B illustrates an intersection, which is displayed in the display device 20. Information on the image of the intersection is expressed using node and link information illustrated in the right portion of FIG. 3B, which are stored in the records mentioned above, for example.

Node data expresses, with respect to each node, coordinates, a type such as an intersection and a junction, etc. Link data expresses, with respect to each link, coordinates of both ends, type, road length, road width, etc.

For example, ROAD A partially constituting the intersection is expressed with the nodes 100, 101 and the link 200 which connects the nodes 100, 101 as shown in the right portion of FIG. 3B. ROAD B is similarly expressed with a node (for example, node 102) and a link. Here, the node 102 among the nodes and link expressing ROAD B is the same as the node 100. Specifically, the coordinates and the type are identical in both nodes 100, 102. It is because the node 100 and the node 102 express the identical point. In such a case, instruction information (pointer 300 in FIG. 3B) is defined which indicates that the data of the node 102 should just refer to the data of the node 100. That is, the data of the node 102 is identical to the data of the node 100 which is pointed as an origin by the pointer 300.

Similarly, the data of the node 103 is determined to be identical to the data of the node 102 with the pointer 301. Similarly, the data of the node 104 is determined to be identical to the data of the node 103 with the pointer 302. Furthermore, the data of the node 100 is determined to be identical to the data of the node 104 with the pointer 303.

Thus, at least the data of the nodes 102, 103, 104 can be omitted if the node 100 and the pointers 300, 301, 302 are provided. That is, for example, the data of the node 102 is inevitably determined by the data of the node 100 and the data of the pointer 300. The same rule can be applied to the nodes 103, 104. Furthermore, the pointer 303 is omissible if the data of the node 100 is available.

The deletion rule (1) (iv) signifies that the data of the identical nodes 102, 103, 104 are deleted. The rule (1) (v) signifies that the pointer 303 as the end pointer of the identical node is deleted.

The road map data include small region data for covering a relatively small region and large region data for covering a wider or larger region. A map covering a large region can be displayed by combining corresponding multiple small region data items. Such a method involves a disadvantage to require an additional time period for the map to display. To solve the disadvantage, large region data covering the large region may be initially prepared. The deletion rule (1) (vi) signifies that the large region data are deleted. That is, large region data can be generated from the small region data if at least provided although requiring an additional time period to display. Thus, the large region data are deleted.

Figure 3C:
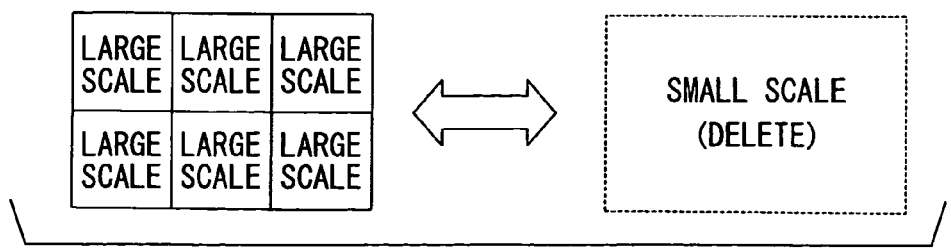

For instance, in FIG. 3C, an identical map region is illustrated in both the left portion and right portion. The map in the left portion, the map is generated based on six large scale map data ($1/10,000$ or $1/20,000$) while in the right portion, based on one small scale map data ($1/40,000$ or $1/80,000$). Thus, the small scale map data (corresponding to large region data) can be deleted. To display the map with the smaller scale $1/40,000$, the following takes place in the navigation apparatus 50.

(1) Reading multiple map data of the scale $1/10,000$ to cover an area to display.

(2) combining the read multiple map data of $1/10,000$ while reducing so as to fit in the predetermined display screen of a display device 53.

Thereby, the map equivalent to the map of $1/40,000$ can be displayed in the display device 53. The deletion rule (1) (vii) signifies the following. For example, the record may include (a) offset data indicating "the region preceding by the predetermined number of bytes" and (b) size data indicating "data volume of the predetermined bytes." The offset data showing the storing position of predetermined data is required when acquiring the data; in contrast, the size data showing the data volume is not necessary in particular. Thus, the size data is deleted in the deletion rule (1) (vii).

The following explains an example of the deletion rule about the background data frame, which corresponds to the deletion rule (2) (viii) coordinates value varied to 1 to 4 bytes long. In addition, the background corresponds to the image excluding roads, characters, and user interfaces (manual operation button etc.) in the display device 20. For example, the image such as a building, a river, and a mountain corresponds to the background.

Figure 4A:
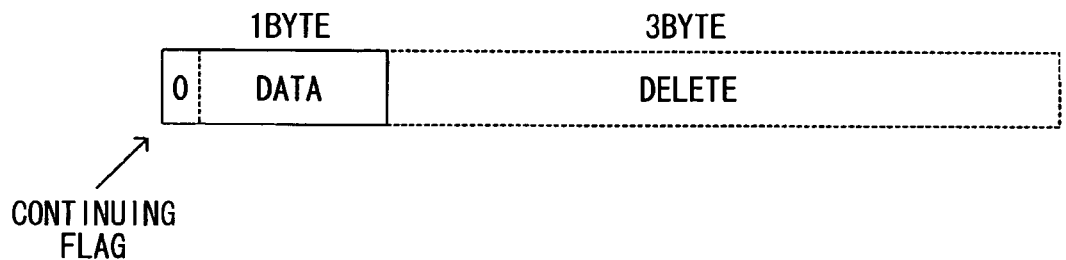
FIGS. 4A, 4B are diagrams illustrating examples of a structure of a background data frame.

An example of the structure of a background data frame is illustrated in FIG. 4A. The background data frame has the predetermined storage area (e.g., 4 bytes) to store data such as a classification of the background or coordinates of the background.

Such data of classification or the coordinates can be expressed with 1 to 2 bytes. In contrast, other background data may be expressed with 4 bytes. Thus, the background data frame has the storage area of 4 bytes.

When storing the data of 1 to 2 bytes, the remaining 3 to 2 bytes of the storage area are unused. The above deletion rule (2) (viii) deletes the storage area or data box of the remaining 3 to 2 bytes. In order to realize such a rule, a continuation flag showing whether the second byte of the background data frame is used in the top bit of the data stored in the background data frame.

In FIG. 4A, the continuation flag of the top bit with "0" means not using the second byte. In other words, it means using only the first byte of the background data frame, thus deleting remaining 3 bytes.

Figure 4B:
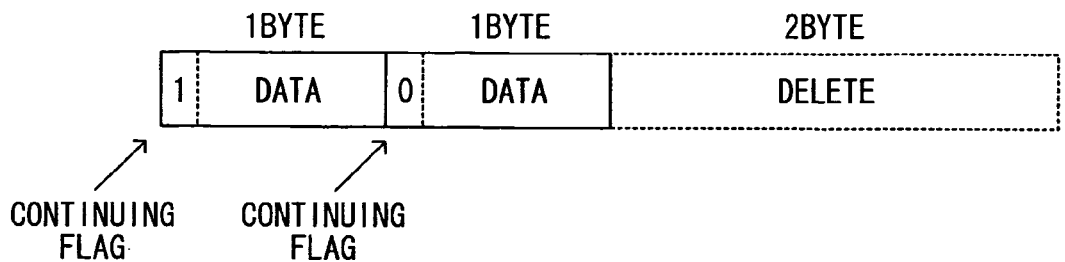

In FIG. 4B, the continuation flag of the top bit with "1" means using the second byte in the data frame. Furthermore, the continuation flag showing whether the following third byte is used also in the top bit of the second byte. In FIG. 4B, the continuation flag of the top bit of the second byte with "0" means not using the third byte and bytes subsequent thereto, thus deleting the remaining third and subsequent bytes.

Thus, the continuation flag is stored in the background data frame to determine how many bytes are used among the storage areas of the background data frame, thereby deleting the remaining storage areas that are not used.

Next, the deletion rule (3) (ix) signifies deletion of data for calculating a route having a predetermined distance or longer among all the data. The deletion rule (4) (x) signifies deleting the category with low importance referred to as "miscellaneous companies" among the retrieval data. The deletion rule (5) (xi) signifies leaving one of overlapping character data while deleting the other, thus sharing the one character data in other data or programs.

Next, FIG. 5 is a flowchart showing a road map data restoration process executed by the CPU 11. At S210, the road map data (or the predetermined data frame among the road map data) stored at S130 is read from the memory card 60 via the memory card reader-writer 40.

At S220, the read road map data (or data frame which constitutes the road map data) is restored to the road map data before reducing data volume. That is, it restores to the primary road map data read from the DVD-ROM etc. at S110.

Specifically, the road map data is restored based on a restoration rule, which is predetermined and previously stored in the ROM 12 etc. while pairing with the above deletion rule, i.e., the deletion rule and the restoration rule have one-to-one correspondence. The restoration rule is as follows:

(1) Road data frame(i) unused restored
(ii) fixed value: 1 restored
(iii) management field: 3 to 9 extended
(iv) identical node coordinates data restored
(v) identical node end pointer restored
(vi) large region data restored
(vii) of (offset data+size data), size data restored
(2) Background data frame
(viii) coordinates value restored to 4 bytes long
(3) Route data frame
(ix) long distance calculation data restored
(4) Retrieval data (POI)
(x) "miscellaneous companies" category restored
(5) Name data frame
(xi) arrangement of character data restored The contents of the restoration rule and the contents of the deletion rule conflict with each other. For instance, the deletion rule deletes a fixed value "1" while the restoration rule restores a fixed value "1." After the restoration rule is applied, the reduced road map data can be restored to the primary road map data before the deletion rule is applied to.

Next, at S230, an accordance check is performed as an inspecting means to determine whether the restored road map data is consistent or accords with the primary road map data stored in the DVD-ROM. Herein, the primary road map data is anew read from the DVD-ROM etc. In addition, the primary road map data read from the DVD-ROM etc. at S110 may be once stored in the HDD 14. At S230, the primary road map data stored in the HDD 14 may be read.

Figure 6:
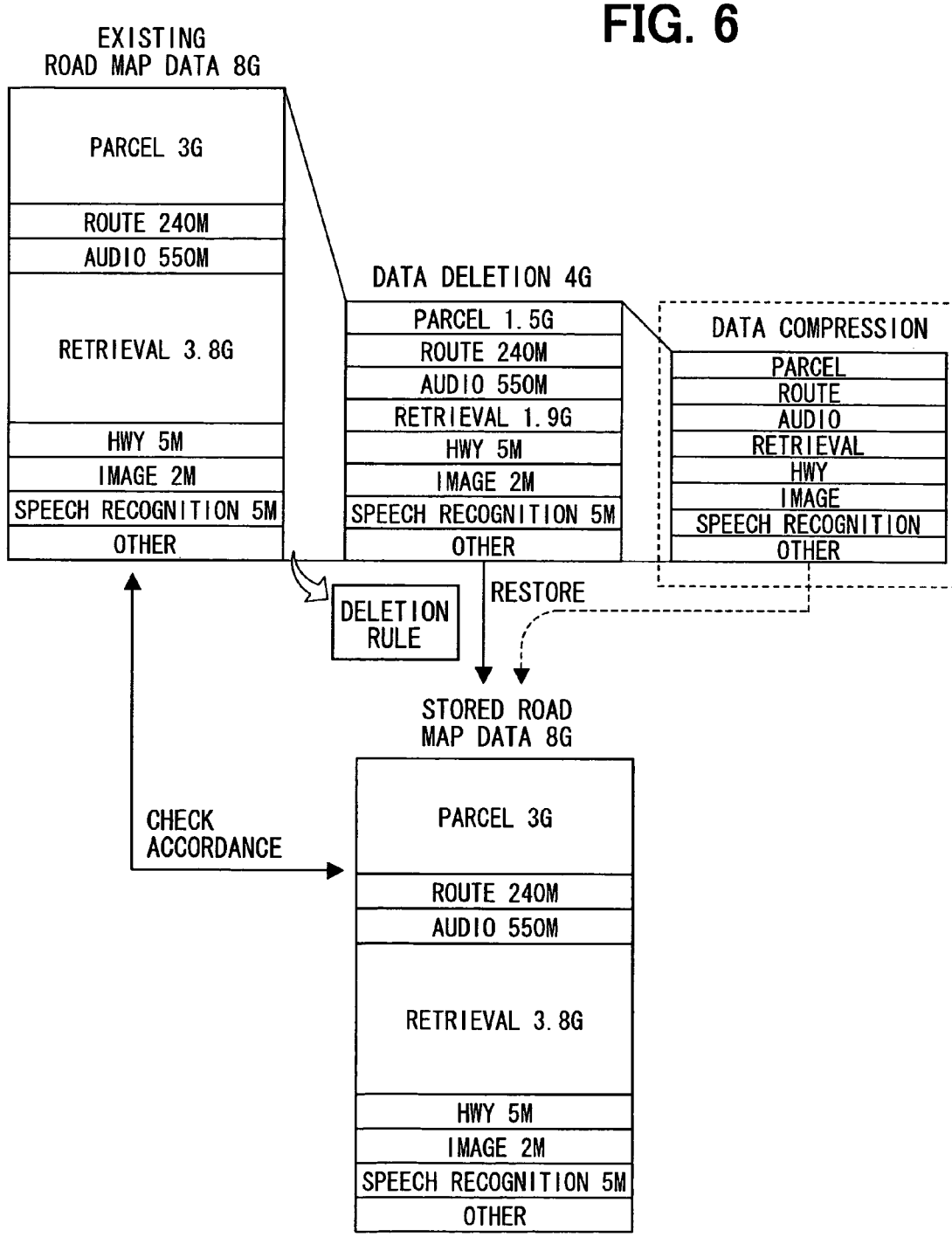
FIG. 6 is a diagram showing an operation of the road map data generation apparatus.

At S230, in addition, the result of the accordance check is notified by being displayed in the display device 20. Next, FIG. 6 illustrates an operation of the road map data generation apparatus 1. FIG. 6 schematically expresses the data configuration, reduction of the data volume, and restoration, with respect to the road map data.

In FIG. 6, "Parcel" expresses the data for drawing. For example, the road map is divided into rectangles with a suitable longitude width and latitude width, and each of the divided areas is called a parcel. A single parcel is displayed in the display device 20, or multiple parcels joining together are displayed in the display device 20. In addition, "Route" expresses the data for route calculation; "Audio" expresses the data for the audio guidance; "Retrieval" expresses the data for retrieval; "HWY" expresses the data related to a highway; "Image" expresses the data of the image displayed as a road map; and "Speech recognition" expresses the data for speech recognition.

The road map data generation apparatus 1 reduces the data volume of the existing road map data, for example, the road map data stored in the DVD-ROM etc. based on the deletion rule (S120). Reduction of the data volume is executed so that the road map data after the data volume reduction can be accommodated in the storage medium such as a memory card or CD-ROM.

Here, the road map data generation apparatus 1 applies the deletion rule to the primary road map data to thereby reduce the data volume, and applies the restoration rule pairing with the deletion rule to the reduced road map data to thereby restore the primary road map data (S220). The accordance check is then performed between the restored road map data and the existing road map data (S230). The check determines whether the deletion or restoration of the data volume is correctly executed, or determines whether the quality of the road map data is maintained.

In addition, the data volume of the reduced road map data may be further subjected to a compressing process. This compression process removes the redundancy of the data and is executed using a compression software program on the personal computer, for instance. When restoring the road map data, the compressed data is uncompressed or unzipped and then restored.

Next, the following explains how to use the reduced road map data in the navigation apparatus 50. FIG. 7 shows a flowchart of a process executed by a CPU 51 as a control device of the navigation apparatus 50. In addition, the navigation apparatus 50 is equipped with a memory card-reader 52 to read the reduced road map data stored in the memory card 60.

At S310, in the navigation apparatus 50, the CPU 51 reads the reduced road map data (or data frame which constitutes the same) from the memory card 60.

At S320, the data reduced road map data (or corresponding data frame) is subjected to the restoration process. The contents of the process at S320 are the same as that at S220 in FIG. 5. For example, the navigation apparatus 50 records the above-mentioned restoration rule.

Figure 8A:
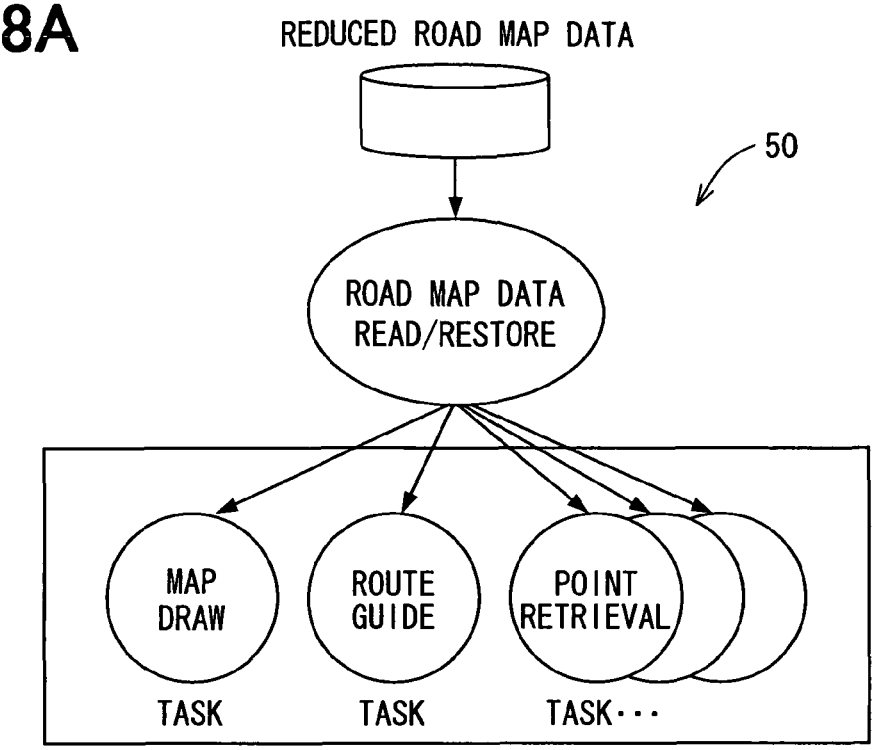
FIG. 8A is a diagram schematically showing the process in FIG. 7.
Figure 8B:
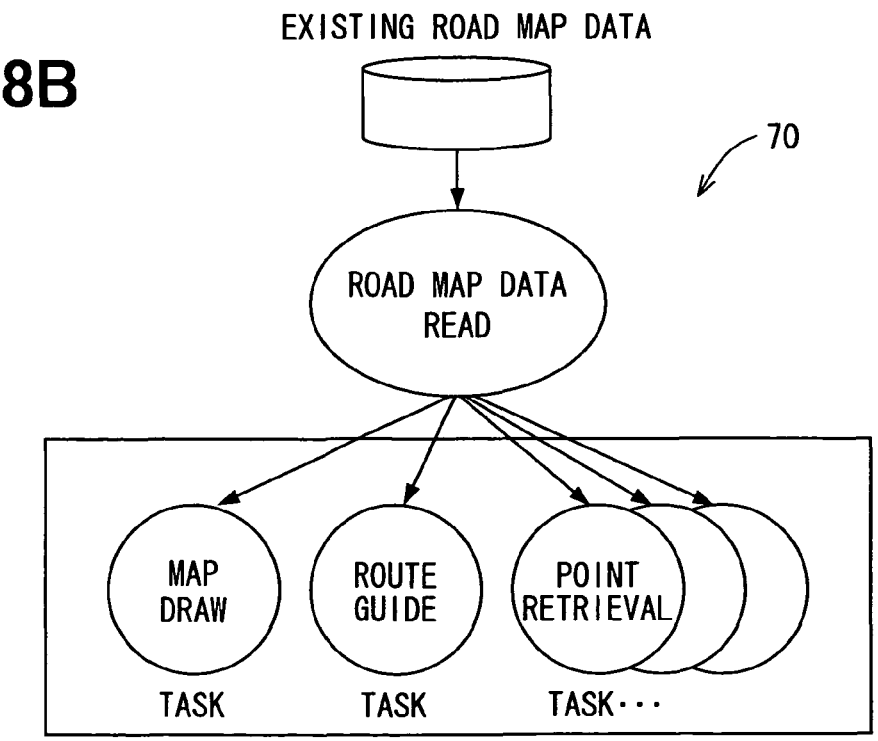
FIG. 8B is a diagram schematically showing a process in a comparative example.

At S330, the restored road map data or the corresponding constituting data frames are distributed to each task. The process is then ended. FIG. 8A illustrates an outline of the process of FIG. 7. FIG. 8B illustrates a process in a usual navigation apparatus 70 as a comparative example to deal with the existing road map data, to which the deletion rule is not applied, in other words, which are not subjected to the data volume reduction process.

As illustrated in FIG. 8A, the reduced road map data are read and then subjected to the restoration process (S320). The restored road map data is distributed to each task such as a map drawing task, a route guidance task, or a spot retrieval task.

In contrast, as illustrated in FIG. 8B, in the usual navigation apparatus 70, as the existing road map data are read and directly distributed to each task.

In both the cases in FIGS. 8A, 8B, each task receives the same data. That is, there is no change in the contents of the data which the task receives between the case where the reduced road map data having undergoing the deletion rule is used and the case where the road map data without undergoing the deletion rule. Thus, the navigation apparatus 50 does not need an additional application program for executing each task at all. Therefore, the existing application program can be used directly without any modification. This is because the reduced road map data is subjected to the restoration process or rule before being distributed to each task. In other words, it is because the road map data generation apparatus 1 is configured to reduce the data volume of the road map data so that it can be restored in the navigation apparatus 50.

As explained above, according to the road map data generation apparatus 1 of the present embodiment, for example, the road map data for a navigation apparatus using a memory card can be generated by partially deleting the existing road map data stored in a DVD-ROM etc. Further, the portion of the existing road map data which is deleted according to the deletion rule is restored in the navigation apparatus 50 according to the restoration rule pairing with the deletion rule.

Accordingly, in the navigation apparatus 50, even if the reduced road map data is used, the same route guidance can be performed as that in the case where the existing road map data is directly used. Accordingly, the quality of the route guidance can be maintained and the user's satisfaction for the navigation apparatus 50 can be prevented from worsening.

In addition, the road map data generation apparatus 1 performs the restoration process for the reduced road map data according to the restoration rule which is identical to the restoration rule stored in the navigation apparatus 50. The road map data after undergoing the restoration process is checked in accordance therebetween with the primary road map data before undergoing the deletion process. Accordingly, it is possible to determine whether the reduced road map data is subjected to the restoration rule to thereby restore the primary road map data appropriately in the navigation apparatus 50. Thus, the quality of the road map data can be verified, providing the user of the road map data and the navigation apparatus 50 with a sense of reassurance.

In the present embodiment, the CPU 11 processing S110 may function as an acquiring means or control unit for acquiring large or primary road map data; the CPU 51 processing S210 may function as an acquiring means or control unit for acquiring reduced road map data; the CPU 11 processing S120 may function as a deleting means or control unit; the CPU 11 processing S220 or the CPU 51 processing S320 may function as a restoring means or control unit; and the CPU 11 processing S230 may function as an inspecting means or control unit. The DVD drive 30 or HDD 14 may function as a storing means or device.

Up to this point, description has been given to an embodiment of the present invention. However, the present invention is not limited to the above embodiment, and it can be variously embodied without departing from the subject matter of the present invention. For example, in the above embodiment, the deletion rule or the restoration rule is stored previously. Instead, information showing the deletion rule and the restoration rule may be generated, for example, during a data volume reduction process or deletion process which reduces data volume. For example, a restoration rule is stored in the memory card along with the reduced road map data, thereby being provided the navigation apparatus 50.

In addition, the reduced road map data generated in the road map data generation apparatus 1 is stored in the memory card 60 which is to be used in the navigation apparatus 50. Alternatively, the reduced map data can be directly, without any memory card or the like, transmitted to the navigation apparatus 50.

Each or any combination of processes, steps, or means explained in the above can be achieved as a software unit (e.g., subroutine) and/or a hardware unit (e.g., circuit or integrated circuit), including or not including a function of a related device; furthermore, the hardware unit can be constructed inside of a microcomputer.

Furthermore, the software unit or any combinations of multiple software units can be included in a software program, which can be contained in a computer-readable storage media or can be downloaded and installed in a computer via a communications network.

Aspects of the disclosure described herein are set out in the following clauses.

As an aspect of the disclosure, a road map data generation apparatus for generating road map data for a navigation apparatus is provided. Here, the navigation apparatus uses a storage device for storing road map data, which is offered for navigating, the offered road map data being generated by applying a predetermined deletion rule to large road map data which has a data volume larger than a storage capacity of the storage device. The navigation apparatus applies a predetermined restoration rule pairing with the deletion rule to the offered road map data read from the storage device to thereby restore the offered road map data to a state before the deletion rule is applied. The road map data generation apparatus comprises an acquiring means for acquiring the large road map data; and a deleting means for applying the deletion rule to the acquired large road map data to thereby perform a deletion process which deletes a portion of the acquired large road map data so as to generate road map data reduced to a data volume equal to or less than the storage capacity of the storage device used in the navigation apparatus. Herein, the reduced road map data is generated as the road map data offered for the navigating.

Herein, the large road map data is assumed to be stored in a hard disk drive (HDD), a DVD-ROM, or the like. The storage device is assumed to be stored in a CD-ROM drive (or a CD-ROM), a memory card reader-writer (or a memory card), or the like.

Under the above configuration, the offered road map data is generated by applying the deletion process to the acquired large road map data to thereby reduce the data volume. Thus, the offered road map data, i.e., the road map data which can be stored in the storage device of the navigation apparatus, can be generated easily by deleting a part of the large road map data.

Further, deleting the portion of the large road map data is according to the deletion rule defined previously; therefore, the navigation apparatus can easily restore the large road map data in the state before the deletion process is applied. That is, in the navigation apparatus, even if the reduced road map data is used, the same route guidance can be performed as that in the case where the existing primary road map data is used. Accordingly, the quality of the route guidance can be maintained and the user's satisfaction for the navigation apparatus can be prevented from worsening.

In addition, deleting data can be according to the predetermined deletion rule; therefore, it is not necessary to transform the road map data into a different format, thus removing a necessity of developing a new format, for example.

As an optional aspect of the road map data generation apparatus, the following may be further included: a storing means for storing road map data equivalent to the acquired large road map data; a restoring means for applying the restoration rule to the reduced road map data to thereby restore road map data, which is in the state before the deletion rule is applied to; and an inspecting means for determining that the restored road map data is abnormal when determining that the restored road map data does not accord with the road map data stored by the storing means.

This leads to improvement in the reliability of the offered road map data currently generated.

As an optional aspect of the road map data generation apparatus, the deletion rule may be configured to delete data having a frequency in use equal to or less than a predetermined threshold value.

As an optional aspect of the road map data generation apparatus, the road map data may include (i) a program for executing an application and (ii) a program for enhancing a performance of an application; and the deletion rule may be configured to delete the program for enhancing the performance of the application while leaving the program for executing the application.

Herein, the application programs include a route calculation program, an audio guidance program, or the like. The programs enhancing the performance of an application include a program which enables execution of route calculation at the high speed more, or a program which enables the audio guidance using a foreign language. Herein, the program of application is not deleted; therefore it is safer since the necessary minimum data is not deleted.

As an optional aspect of the road map data generation apparatus, the road map data may include a group of data items individually having an identical content; and the deletion rule is configured to leave one data item included in the group of data items while deleting data items other than the left one data item.

For example, first road map data relative to "AB City" and second road map data relative to "XY Town" individually have common certain road data (e.g., name data) overlapping with each other. In such a case, the certain road data in either the first or second road map data is left such as being shared while the other redundant certain data in the other is deleted. Data volume can be reduced without degrading the quality of the whole road map data, thus providing a user with satisfaction.

As an optional aspect of the road map data generation apparatus, the road map data may include a plurality of storing areas which are used for storing information; and the deletion rule may be configured to delete a storing area, which has no information, among the storing areas.

Thus, the data volume of the road map data can be reduced certainly, and, moreover, the quality of the road map data does not deteriorate.

As an optional aspect of the road map data generation apparatus, the road map data may include a plurality of storing areas which are used for storing information; and the deletion rule may be configured to delete a storing area, which stores a predetermined fixed value, among the storing areas.

The fixed value predetermined can be easily restored even if it is once deleted.

It will be obvious to those skilled in the art that various changes may be made in the above-described embodiments of the present invention. However, the scope of the present invention should be determined by the following claims.

What is claimed is:

1. A navigation apparatus for navigating using navigating-use road map data that is road map data for navigating, the navigation apparatus comprising:
   a CPU;
   a reader that reads a reduced road map data from a first storage medium that stores the reduced road map data,
      the reduced road map data is a road map data prepared by applying a deletion rule to a primary navigating-use road map data,
      the primary navigating-use road map data has a primary data configuration state that contains a plurality of data frames, each data frame containing (i) a management field where management information is stored, and (ii) a record portion having at least one record,
      the management field defines a record number indicating a number of records stored in the record portion,
      the deletion rule (i) specifies an unused data area, which stores no data in each record, based on the record number of the management field and (ii) deletes the specified unused data area in the data frames included in the primary data configuration state of the primary navigating-use road map data; and
   a storage device that previously records restoration information on a restoration rule that pairs with the deletion rule while taking action opposite to the deletion rule,
   the CPU including
      a restorer configured to execute the restoration rule which is indicated based on the recorded restoration information to the read reduced road map data, when the reduced road map data is read from the first storage medium by the reader,
      the restoration rule configured to read the reduced road map data which (i) specifies an unused data area, which was deleted in the deletion rule and (ii) restores the specified unused data area in a state identical to a state of the unused data area deleted in the deletion rule, to generate a navigating-use road map data,
      such that a data configuration state of the generated navigating-use road map data is identical to the primary data configuration state of the primary navigating-use road map data.

2. The navigation apparatus according to claim 1, further storing an application which executes a route guidance using the data frames, the restorer restores data frames, which are identical to the data frames included in the primary data configuration state of the primary navigating-use road map data, so as to correspond to the application, from the data frames included in the reduced road map data.

3. A road map data generation apparatus for providing the navigation apparatus according to claim 1 with the reduced road map data, the road map data generation apparatus comprising:
a CPU configured to execute various rules based on a predetermined program;
a ROM that previously stores a program of the deletion rule to (i) specify an unused data area, which stores no data in each record, and (ii) delete the specified unused data area in the data frames included in the primary data configuration state of the primary navigating-use road map data;
a drive that reads the primary navigating-use road map data from a second storage medium storing the navigating-use road map data, according to an instruction of the CPU;
a storage device that stores the primary navigating-use road map data read by the drive according to an instruction of the CPU; and
a writer that writes data in the first storage medium according to an instruction of the CPU;
the CPU including
a deleter configured to execute a program of the deletion rule so as to apply the deletion rule to the primary navigating-use road map data stored in the storage device,
the CPU being further configured to transmit road map data, where the unused data area is deleted by the program of the deletion rule executed by the deleter, to the writer,
the writer being further configured to write in the first storage medium the road map data transmitted by the CPU, as the reduced road map data.

4. A navigation apparatus for navigating using navigating-use road map data, the navigation apparatus comprising:
means for reading from a first storage medium a reduced road map data that is prepared by applying a deletion rule to a primary navigating-use road map data,
the primary navigating-use road map data has a primary data configuration state that contains a plurality of data frames, each data frame contains (i) a management field where management information is stored, and (ii) a record portion having at least one record,
the management field defines a record number indicating a number of records stored in the record portion,
the deletion rule (i) specifies an unused data area, which stores no data in each record, based on the record number of the management field and (ii) deletes the specified unused data area, in the data frames included in the primary data configuration state of the primary navigating-use road map data; and
means for previously recording restoration information on a restoration rule, which pairs with the deletion rule while taking action opposite to the deletion rule; and
means for executing the restoration rule indicated based on the recorded restoration information to the reduced road map data that is read from the first storage medium by the reading means, by
specifying in the read reduced road map data an unused data area, which was deleted in the deletion rule and
restoring the specified unused data area in a state identical to a state of the unused data area deleted in the deletion rule,
to generate a navigating-use road map data, such that a data configuration state of the generated navigating-use road map data is identical to the primary data configuration state of the primary navigating-use road map data.

* * * * *